Patented Apr. 7, 1936

2,036,916

UNITED STATES PATENT OFFICE 2,036,916

COMPLEX PHENOLIC SOAP

Herman A. Bruson, Philadelphia, Pa., assignor to Röhm & Haas Company, Philadelphia, Pa.

No Drawing. Application May 28, 1934,
Serial No. 727,963

17 Claims. (Cl. 260—130)

This invention relates to new soaps, wetting and emulsifying agents and to the process for producing them. It relates particularly to new salts which are made by reacting on a soap-forming acid having more than seven carbon atoms in a molecule with a complex non-resinous condensation product of a phenol, formaldehyde and a strongly basic non-aromatic secondary amine.

This application is a continuation-in-part of my copending application, Serial No. 703,839, filed December 23, 1933. In that application I described new soap-forming bases prepared by condensing alkyl phenols containing at least four carbon atoms in the alkyl substituent, with formaldehyde and strongly basic, non-aromatic, secondary amines. These bases, when treated with water soluble acids give water soluble soaps, but when treated with acids such as oleic, or stearic for example, the soaps formed are insoluble in water, but are soluble in oils.

According to the present invention, soaps which are soluble in water as well as in oil can be obtained from acids which are insoluble in water, provided the base is prepared from phenols which are relatively more soluble in water than the alkylated phenols containing at least four carbon atoms in a side chain.

Particularly valuable soaps which are soluble in water as well as in hydrocarbons or fatty oils are obtained according to the present invention by reacting on a soap-forming acid containing more than seven carbon atoms with a non-resinous condensation product obtained by treating phenol, cresol, xylenol, resorcinol, chlorphenol and the like, i. e. phenols which are relatively soluble in water and which contain less than four carbon atoms in any nuclear-substituent, with at least one molecular equivalent each of formaldehyde and a strongly basic, non-aromatic water-soluble secondary amine. Such non-resinous condensation products are either liquids or crystalline compounds containing a free phenolic group. When these bodies react with a soap-forming acid containing more than seven carbon atoms, phenolic soaps are obtained which, in water-solution, show the characteristic properties of soaps, namely low surface tension, a tendency to foam when shaken, and marked emulsifying and detergent properties. On account of their phenolic character they have decided bactericidal and antiseptic properties which render them eminently suitable for use as germicidal soaps either alone or in admixture with the usual hand soaps or laundry soaps.

By varying the nature of the phenols used, as for example, by using alkylated phenols having four or more carbon atoms in the alkyl group such as butyl, amyl, hexyl, octyl, phenyl, or cyclohexylphenols; or by introducing other non-acidic substituents into the phenolic nucleus such as alkoxy, hydroxy, aryloxy, nitro, bromo, iodo, hydroxyalkyl, or other noninterfering groups, soaps having different solubilities in water or in hydrocarbons can be prepared.

It is understood that the term "a phenol" as used herein refers broadly to the class of nuclear hydroxy aromatic compounds of either monocyclic or polycyclic structure, including naphthols and hydroxyquinolines. These phenols must be free from acidic or acid-forming groups such as carboxyl, sulfonic, or aldehydo groups which apparently inhibit the proper condensation with formaldehyde and the secondary amine. The phenols used must contain at least one reactive nuclear position either ortho or para to the phenolic hydroxyl group, as otherwise the formaldehyde and secondary amine cannot combine therewith in the desired manner. The following additional nuclear substituents can be present in the phenols used, namely hydroxyl, alkoxy, aryloxy, aryl, aralykyl, alkyl, halogen, nitro, amino, methylol, hydroxyalkyl, keto, and similar non-interfering groups or radicals.

Among the phenols which are suitable for the purpose of this invention, are the following:

Phenol, o, m, and p-cresol, 1,3,5 xylenol, thymol, carvacrol, the chlorphenols, guaiacol, resorcinol, resorcinol mono-ethyl ether, alpha- or beta-naphthol, o, m, or p-phenylphenol, cyclohexylphenol, p-sec-butylphenol, p-ter-butylphenol p-ter-amylphenol p-sec-hexylphenol, n-hexylresorcinol, caproyl-resorcinol, $\alpha,\alpha,\gamma,\gamma$-tetramethyl-butyl-phenol, p.p'-(dihydroxydiphenyl)-dimethylmethane, isopropyl-resorcinol di-isopropyl resorcinol, o-hydroxy-quinoline, diamylphenol, 1,5-dihydroxy-naphthalene, and their obvious equivalents.

The strongly basic, nonaromatic secondary amines referred to herein have the general formula R—NH—R$_1$ where R and R$_1$ are alkyl, hydroxyalkyl, or ring methylene groups where R and R$_1$ advantageously have a combined carbon content of less than seven carbon atoms. These amines must also be free from interfering groups such as carboxyl, nitrile, or aldehydo groups. Secondary amines which are particularly suitable are morpholine, dimethylamine, methyl ethylamine, diethylamine, dipropylamine, piperidine, piperazine, diethanolamine and triethylene tetramine $H_2N-CH_2CH_2NHCH_2CH_2NHCH_2CH_2NH_2$.

Aromatic secondary amines such as N-methylaniline, dibenzylamine and the like are inoperative in the present process. Higher secondary amines having a total carbon atom content greater than seven, such as dibutylamine or diamylamine, can also be used, particularly to obtain soaps which are more soluble in organic liquids.

The reaction between the phenols, formaldehyde and secondary amine is preferably carried out using one molecular equivalent each of the reactants, either in water or in an inert solvent such as alcohol. With the lower phenols which are very reactive and tend to form resins, the reaction is carried out at temperatures below 45° C. The complex condensation product usually separates as a thin oil after twenty four hours standing at room temperature. This oil can be used in the crude form, or after thoroughly washing out any traces of water-soluble impurities; or it can be purified by distillation in vacuo or by crystallization, depending upon the product formed. Such products are referred to herein as "complex, non-resinous condensation products of phenols, formaldehyde and strongly basic, non-aromatic secondary amines". In some cases two molecular equivalents each of formaldehyde and secondary amine can be reacted with one mol. equivalent of the phenol. If, however, less than one mol. equivalent each of the secondary amine and formaldehyde is used, the products tend to go over to reactive resins containing uncombined phenol and are not suitable for the present purpose.

The above mentioned complex, non-resinous condensation products of the phenols, formaldehyde and secondary amine are reacted with a sufficient amount of a soap-forming acid containing more than seven carbon atoms to completely combine therewith. The combination takes place with evolution of heat. It can be carried out with or without the use of an inert organic solvent, such as benzene or ethylene dichloride. The resulting soap can then be isolated by evaporating off the solvent.

The new soaps are oily to waxy or petrolatum-like bodies which dissolve either in water or in hydrocarbons, or in both, depending upon the phenols, the amines and the soap-forming acids which are employed.

The term "soap-forming acids containing more than seven carbon atoms" referred to herein is understood to mean the already known carboxylic acids, sulfonic acids, sulfuric acid esters or phosphoric acid esters containing more than seven carbon atoms, whose alkali metal salts dissolve in water to give solutions which foam readily when shaken or produce a lather. Among the common examples of such already-known soap-forming acids are the following:

(a) The aliphatic monocarboxylic acids such as lauric, palmitic, undecylenic, stearic, oleic, ricinoleic, erucic, cerotic, linoleic, elaeostearic, elaidic, hydroxystearic; either pure, or crude as obtained in mixed form directly by the hydrolysis of natural or synthetic fatty oil glycerides; or their halogenated, hydroxylated, arylated, or sulfonated derivatives such as chloro- or dichlorostearic acid, dihydroxy- or tri-hydroxystearic acid, sulfonated ricinoleic acid, sulfonated castor oil acids, stearic acid-alpha-sulfonic acid, or phenylstearic acid.

(b) Higher resin acids such as abietic (rosin), montanic acid, or naphthenic acids from petroleum, or the acidic oxidation products of paraffin waxes or oils.

(c) Sulfonated hydrocarbons, phenols or aromatic ethers having more than seven carbon atoms such as hexadecylsulfonic acid, octylbenzene sulfonic acid, isopropylnaphthalene sulfonic acid, butylphenol sulfonic acid, octyloxyphenyl-sulfonic acid and analogous sulfonic acids of the aliphatic, hydroaromatic, or aromatic series.

(d) Sulfuric acid esters or phosphoric acid esters of aliphatic, aromatic or alicyclic alcohols (either monohydric, polyhydric or ether alcohols) containing more than seven carbon atoms such as octyl-sulfuric acid $C_8H_{17}$—O—$SO_3H$, lauryl-sulfuric acid, cetyl-sulfuric acid, octadecyl-sulfuric acid, oleyl-sulfuric acid, lauryl-phosphoric acid, cetyl-phosphoric acid, cresyloxy-sulfuric acid, a-terpineol-sulfuric acid and analogous acids.

In order to illustrate the process the following examples are given. In these examples, the designated complex condensation products of the phenols, formaldehyde, and secondary amine were prepared as follows:

Condensate A.—To a solution of 94 grams phenol (1 mol.) in 125 grams aqueous 36% commercial dimethylamine solution (1 mol.), 100 grams of aqueous 30% formaldehyde solution (1 mol.) was added dropwise while stirring and cooling to about 30° C. The mixture was allowed to stand 24 hours at room temperature (25° C.). The oil layer which formed was separated from the water layer, washed several times with water to remove traces or unreacted components and distilled in vacuo. The colorless oil boiling at about 97° C./3 mm. was collected. Yield about 120 grams. It is soluble in either dilute sodium hydroxide solution or in dilute hydrochloric acid.

Condensate B.—108 grams ortho-cresol, 125 grams 35% dimethylamine solution, and 100 grams 30% formaldehyde solution were treated as above. The product obtained was a colorless oil boiling at about 104° C./4 mm.

Condensate C.—From 1 mol each of 1,3,5-xylenol, formaldehyde and dimethylamine treated as above the product obtained boiled at 135–145° C./12 mm. and crystallized in colorless plates melting at about 40° C.

Condensate D.—To a solution of 94 grams phenol in 100 ccm. water containing 103 grams diethanolamine, 100 grams of aqueous 30% formaldehyde was added while cooling and stirring. After 24 hours standing the water was distilled off in vacuo on a hot water bath. A pale yellow, very viscous oil was obtained. It is completely soluble in dilute hydrochloric or sulfuric acid.

Condensate E.—To a solution of 228 grams pp' - (dihydroxydiphenyl) - dimethylmethane (1 mol.)

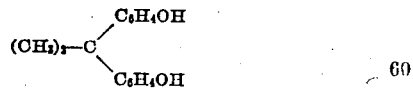

in 250 grams (2 mols) aqueous 36% dimethylamine solution there was added dropwise, 200 grams aqueous 30% formaldehyde solution (2 mols) while stirring and cooling. The oil which separated after standing 24 hours was washed thoroughly with water and dried in vacuo at a low temperature.

Example 1.—Upon thoroughly mixing 28 grams of oleic acid with either 15 grams of condensate A, or with 16.6 grams of condensate B or with 18 grams of condensate C, heat is evolved and in each case an oil is obtained which is soluble in water to form a very soapy, foamy solution having excellent emulsifying properties for oils or hydrocarbons. The soap is also readily soluble in petroleum naphtha or vegetable or animal oils. In place of oleic acid any of the soap-forming fatty acids enumerated herein can be used in equivalent molecular proportions to form similar soaps, such acids as cocoanut oil fatty acids, palmitic acid, linseed oil fatty acids, or ricinoleic acid being particularly useful for the purpose. The resinates of condensates A, B, or C are likewise useful soaps.

Instead of using a soap-forming fatty acid, alkyl sulfuric acids of long chain alcohols can be used as shown in the following example:—

*Example 2.*—26 grams of technical laurylsulfuric acid (0.1 mol) $C_{12}H_{25}O$—$SO_3H$ (prepared by treating lauryl alcohol with concentrated sulfuric acid at about 20° C.) in 130 grams ethylene dichloride was cooled to about 5° C., and 15 grams of condensate A dissolved in 30 grams ethylene dichloride was added thereto dropwise with stirring so that the temperature did not exceed 10° C. A clear solution was obtained. The new soap was isolated therefrom by distilling off the ethylene dichloride. The soap obtained was a thick pale yellow oil which is readily soluble in water as well as in hydrocarbons and fatty oils. It gave no precipitate with dilute acid or alkali and forms no water-insoluble lime soaps in hard water. Its aqueous solution possesses good wetting and detergent properties.

Instead of laurylsulfuric acid, one may use 32 grams of cetylsulfuric acid $C_{16}H_{33}O$—$SO_3H$ or 35 grams of n-octadecyl sulfuric acid, in the above case. The soaps obtained are petrolatum-like masses which have excellent detergent properties in aqueous solution. They are also readily soluble in hydrocarbons and fatty oils. By using in place of condensate A, either 17 grams of condensate B or 18 grams of condensate C in the reaction with the above weights of laurylsulfuric acid, cetylsulfuric acid or octadecyl sulfuric acid analogous soaps are obtained.

*Example 3.*—The oleate of condensate D was prepared by mixing 27 grams of oleic acid with 21 grams of condensate D. A thick oil readily soluble in water and giving a soap solution was obtained. It is also soluble in gasoline and is a good emulsifying agent for oils and water. The laurylsulfate of condensate D was prepared by mixing 25 grams laurylsulfuric acid with 21 grams condensate D at 10° C. in ethylene dichloride solution. Upon distilling off the solvent, the residual product obtained was a viscous yellow oil. Its aqueous solution is a good detergent and wetting agent.

The laurylsulfuric acid can be replaced by a molecularly equivalent quantity of cetylsulfuric acid, octadecylsulfuric acid, etc. The product in each case is a viscous mass readily soluble in water. Instead of using laurylsulfuric acid, an equivalent amount of a sulfonated hydrocarbon such as isopropyl naphthalene sulfonic acid can be used.

*Example 4.*—Upon mixing 34 grams of condensate E with 56 grams oleic acid a phenolic soap was obtained having valuable properties.

*Example 5.*—A mixture of 2 mols of phenol, 2 mols of formaldehyde (30% solution) and 1 mol of triethylene tetramine was allowed to stand 24 hours at room temperature, the thick heavy oil was isolated from the product by evaporating off the water in vacuo. It was readily soluble in either dilute hydrochloric acid or in caustic soda solution. This oil was neutralized with oleic acid and gave an oil soluble phenolic soap.

*Example 6.*—The crystalline condensation product melting at 76° C. obtained by condensing 1 mol. beta-naphthol with 1 mol. formaldehyde and 1 mol dimethylamine at room temperature is neutralized with 1 mol. of laurylsulfuric acid. An oily mass is obtained which slowly crystallizes. It is readily soluble in water or in hydrocarbons and possesses marked detergent and emulsifying properties.

The soap forming acids shown in the foregoing examples may be replaced by a molecularly equivalent amount of any of the other soap forming acids mentioned above or their obvious equivalents, and the soaps obtained will have similar properties.

All of these soaps contain the phenolic hydroxyl group in the positive radical of the salt and therefore have bactericidal properties. In order to increase the bactericidal properties the phenols used to make the condensates A, B, C, D and E above can be replaced by equivalent quantities of resorcinol, guaiacol, thymol, chlorphenol, chlorcresol, etc. if desired.

By using higher alkylated phenols such as phenylphenol, amylphenol, butylphenol, octylphenols and the like in analogous fashion, oil-soluble phenolic soaps are obtained.

It is understood that the strongly basic secondary non-aromatic amines referred to in the claims are free from acidic or acid-forming groups, which prevent the reaction from taking place.

The soaps prepared in accordance with this invention can be used as emulsifying agents, for oils, fats, and waxes, as ingredients in insecticide compositions, or as detergents and wetting agents in the laundering, scouring, dyeing, tanning, and mordanting industries. They may also be used for preparing boring or metal-cutting oils, cattle dips, metal pickling inhibitors, and for pharmaceutical purposes.

What I claim is:

1. A process for preparing a soap-like material which comprises reacting upon (1) a soap-forming acid having more than seven carbon atoms with (2) a preformed, non-resinous, complex condensation product of a phenol with at least one molecular equivalent each of formaldehyde and a strongly basic, non-aromatic, secondary amine, said phenol being free from acidic and acid-forming groups and having at least one free nuclear position ortho or para to the phenolic hydroxyl group.

2. A process for preparing a soap-like material which comprises reacting upon (1) a soap-forming acid having more than seven carbon atoms with (2) a pre-formed, non-resinous, complex condensation product of a phenol with at least one molecular equivalent each of formaldehyde and a strongly basic, non-aromatic, secondary amine having less than seven carbon atoms, said phenol being free from acidic and acid-forming groups and having at least one free nuclear position ortho or para to the phenolic hydroxyl group.

3. A process for preparing a soap-like material which comprises reacting upon (1) a soap-forming acid having more than seven carbon atoms with (2) a pre-formed, non-resinous, complex condensation product of a phenol with at least one molecular equivalent each of formaldehyde and a strongly basic, non-aromatic, secondary amine which is one of the group consisting of dimethylamine, diethylamine, dipropylamine, methyl ethylamine, piperazine, morpholine, diethanolamine, piperidine and triethylene tetramine, said phenol being free from acidic and acid-forming groups and having at least one free nuclear position ortho or para to the phenolic hydroxyl group.

4. A process for preparing a soap-like material which comprises reacting upon (1) an aliphatic monocarboxylic acid having more than seven carbon atoms with (2) a pre-formed non-resinous condensation product of a phenol with at least one molecular equivalent each of formaldehyde and a strongly basic, non-aromatic, secondary amine, said phenol being free from acidic and acid-forming groups and having at least one free nuclear position ortho or para to the phenolic hydroxyl group.

5. A process for preparing a soap-like material which comprises reacting upon (1) the mono alkyl sulfuric acid ester of an alcohol having more than seven carbon atoms with (2) a pre-formed, non-resinous condensation product of a phenol with at least one molecular equivalent each of formaldehyde and a strongly basic, non-aromatic, secondary amine, said phenol being free from acidic and acid-forming groups and having at least one free nuclear position ortho or para to the phenolic hydroxyl group.

6. A process for preparing a soap-like material which comprises reacting upon (1) a sulfonated hydrocarbon having more than seven carbon atoms with (2) a pre-formed, non-resinous condensation product of a phenol with at least one molecular equivalent each of formaldehyde and a strongly basic, non-aromatic, secondary amine, said phenol being free from acidic and acid-forming groups and having at least one free nuclear position ortho or para to the phenolic hydroxyl group.

7. A process for preparing a soap-like material which comprises reacting upon (1) the monoalkyl sulfuric acid ester of a monohydric alcohol having from eight to eighteen carbon atoms inclusive with (2) a pre-formed, non-resinous complex condensation product of equimolecular quantities of a phenol, formaldehyde and a strongly basic, non-aromatic, secondary amine having less than seven carbon atoms, said phenol being free from acidic and acid-forming groups and having at least one free nuclear position ortho or para to the phenolic hydroxyl group.

8. A process for preparing a soap-like material which comprises reacting upon (1) an aliphatic monocarboxylic acid having more than seven carbon atoms with (2) a preformed non-resinous complex condensation product of equimolecular quantities of a phenol, formaldehyde and a strongly basic, non-aromatic, secondary amine having less than seven carbon atoms, said phenol being free from acidic and acid-forming groups and having at least one free nuclear position ortho or para to the phenolic hydroxyl group.

9. A process for preparing a soap-like material which comprises reacting upon lauryl sulfuric acid with a pre-formed, non-resinous complex condensation product of equimolecular quantities of a phenol, formaldehyde and a strongly basic, non-aromatic, secondary amine having less than seven carbon atoms, said phenol being free from acidic and acid-forming groups and having at least one free nuclear position ortho or para to the phenolic hydroxyl group.

10. A salt having as its basic constituent a preformed, non-resinous complex condensation product of a phenol with at least one molecular equivalent each of formaldehyde and a strongly basic non-aromatic secondary amine, said phenol being free from acidic or acid-forming groups and having at least one free nuclear position ortho or para to the phenolic hydroxyl group, and as its acid constituent a soap-forming acid having more than 7 carbon atoms.

11. A salt having as its basic constituent a preformed, non-resinous complex condensation product of a phenol with at least one molecular equivalent each of formaldehyde and a strongly basic non-aromatic secondary amine, said phenol being free from acidic or acid-forming groups and having at least one free nuclear position ortho or para to the phenolic hydroxyl group, and as its acid constituent an aliphatic monocarboxylic acid having more than 7 carbon atoms.

12. A salt having as its basic constituent a preformed, non-resinous complex condensation product of a phenol with at least one molecular equivalent each of formaldehyde and a strongly basic non-aromatic secondary amine, said phenol being free from acidic or acid-forming groups and having at least one free nuclear position ortho or para to the phenolic hydroxyl group, and as its acid constituent an alkyl sulfuric acid having more than 7 carbon atoms.

13. A salt having as its basic constituent a preformed, non-resinous complex condensation product of a phenol with at least one molecular equivalent each of formaldehyde and a strongly basic non-aromatic secondary amine, said phenol being free from acidic or acid-forming groups and having at least one free nuclear position ortho or para to the phenolic hydroxyl group, and as its acid constituent a sulfonated hydrocarbon having more than 7 carbon atoms.

14. A salt having as its basic constituent a preformed, non-resinous complex condensation product of a phenol with at least one molecular equivalent each of formaldehyde and a strongly basic non-aromatic secondary amine, having less than 7 carbon atoms, said phenol being free from acidic or acid-forming groups and having at least one free nuclear position ortho or para to the phenolic hydroxyl group, and as its acid constituent a soap-forming acid having more than 7 carbon atoms.

15. A salt having as its basic constituent a preformed, non-resinous complex condensation product of equi-molecular quantities of phenol, dimethylamine and formaldehyde and as its acid constituent oleic acid.

16. A salt having as its basic constituent a preformed, non-resinous complex condensation product of equi-molecular quantities of phenol, dimethylamine and formaldehyde and as its acid constituent lauryl sulfuric acid.

17. A salt having as its basic constituent a preformed, non-resinous complex condensation product of equi-molecular quantities of phenol, diethanolamine and formaldehyde and as its acid constituent cetyl sulfuric acid.

HERMAN A. BRUSON.